(12) United States Patent
Wither et al.

(10) Patent No.: US 10,185,788 B2
(45) Date of Patent: Jan. 22, 2019

(54) RULE BASED COMPLETION OF MAPS WITH PARTIAL DATA

(71) Applicant: Samsung Electronics Co., Ltd., Suwon-si, Gyeonggi-do (KR)

(72) Inventors: Jason R. Wither, San Jose, CA (US); Jasvinder Singh, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 519 days.

(21) Appl. No.: 14/881,564

(22) Filed: Oct. 13, 2015

(65) Prior Publication Data

US 2017/0103145 A1 Apr. 13, 2017

(51) Int. Cl.
*G06F 17/50* (2006.01)
*G09B 29/10* (2006.01)

(52) U.S. Cl.
CPC ....... *G06F 17/5004* (2013.01); *G09B 29/106* (2013.01); *G06F 2217/06* (2013.01); *G06F 2217/10* (2013.01)

(58) Field of Classification Search
CPC ............ G06F 17/5004; G06F 2217/06; G06F 2217/10; G09B 29/106
USPC ..................... 703/1; 701/206, 409
See application file for complete search history.

(56) References Cited

U.S. PATENT DOCUMENTS

2013/0257657 A1* 10/2013 Garin ................... G01C 21/206
342/451
2014/0171068 A1* 6/2014 Marti ...................... G01S 1/047
455/427
2015/0204676 A1* 7/2015 Zhang .................. G01C 21/206
701/410

FOREIGN PATENT DOCUMENTS

| JP | 2014-139538 | 7/2014 |
| WO | 2014-026338 | 2/2014 |
| WO | 2015-126901 | 8/2015 |

OTHER PUBLICATIONS

Shen et al. "Walkie-Marki: Indoor Pathway Mapping Made Easy". 10th USENIX Symposium on Networked Systems Design and Implementation, 2013., p. 85-98. (Year: 2013).*
International Search Report dated Sep. 23, 2016 from International Application No. PCT/KR2016/005962.
Written Opinion dated Sep. 23, 2016 from International Application No. PCT/KR2016/005962.
Partial European Search Report regarding Application No. 16855596.9, dated Sep. 12, 2018, 11 pages.
Aydemir et al., "Predicting What Lies Ahead in the Topology of Indoor Environments", International Conference on Spatial Cognition, Aug. 2012, pp. 1-16.
Ström et al., "Predictive Exploration Considering Previously Mapped Environments", 2015 IEEE International Conference on Robotics and Automation (ICRA), May 2015, pp. 2761-2766.

* cited by examiner

*Primary Examiner* — Eunhee Kim

(57) ABSTRACT

A rule set is used to generate an indoor map of a building from partial map data. In one embodiment, the partial map data is based at least in part on crowd sourced trajectory data. In one embodiment, a probabilistic rule set describes relationships in space usage of the indoor building. Hypothesis testing is performed. A most likely complete layout is determined, based on the partial coverage data and the rule set, which preserves the partial map data.

21 Claims, 13 Drawing Sheets

| General Geometric Constraints that can be learned by analyzing existing labeled mall maps | Example Learned Values | | |
|---|---|---|---|
| | Store | Anchor Store | Food Store |
| Size (m) | 10x20 | 60x60 | 5x5 |
| Size Variance | 40% | 30% | 20% |
| Nearby Size Consistency | 80% | 60% | 90% |
| Next to Store Prob. | 90% | 100% | 10% |
| Next to Anchor Store Prob. | 20% | 0% | 5% |
| Next to Food Store Prob. | 20% | 5% | 95% |
| Likelihood of size similarity to detected store of same category | 80% | 60% | 80% |
| Hallways neighboring exterior of building? | 5% | | |

*FIG. 3B*

| Further Semantic Rules | Examples |
|---|---|
| Shop Size Based on POI | Gap detected, all Gap stores average 20x20 with a 30% std dev |
| Shop Clustering by type | Prada detected, 80% probability Louis Vuitton within 4 stores |
| Total number of shops fro POI DB | Mall X has 112 total shops |
| Overall Shape probabilities | Given mall footprint size, number of anchor stores, hallway layout probability, etc. |
| Shop size based on footprint, hallway geometry | Main hallway is 50m from building exterior, shops are wide, hallway 10m from building exterior, shops are narrow |

*FIG. 3C*

| Rule | Example Learned Values | | |
| --- | --- | --- | --- |
| | Patient Room | Lab | OR |
| Size (m) | 5x5 | 9x20 | 8x8 |
| Size Variance | 10% | 30% | 20% |
| Nearby Size Consistency | 90% | 40% | 60% |
| Next to Patient Room Prob. | 95% | 5% | 10% |
| Next to Lab Prob. | 5% | 90% | 5% |
| Next to Operating Room Prob. | 10% | 5% | 80% |
| Likelihood of size similarity to detected room of same category | 80% | 80% | 80% |
| Chance of Hallways on Exterior? | 5% | | |

*FIG. 4B*

Room Width $$Score_W = \left(1 - \frac{abs(W-W_D)}{W_D}\right)^\alpha$$

W = Current width
$W_D$ = Ideal width (input)
$\alpha$ = Scaling Factor

Room Similarity $$Score_S = \left(\frac{\left(1 - \frac{abs(A - A_L)}{A_L}\right) + \left(1 - \frac{abs(A - A_R)}{A_R}\right)}{2}\right)^\alpha$$

A = Current room size
$A_L$ = Size or room to left
$A_R$ = Size or room to right
$\alpha$ = Scaling Factor Room Entrance $$Score_E = \begin{cases} \left(\frac{W_L}{W_R}\right)^\alpha & W_L < W_R \\ \left(\frac{W_R}{W_L}\right)^\alpha & W_L > W_R \end{cases}$$

$W_L$ = Length of wall from entrance to left side of room
$W_R$ = Length of wall from entrance to right side of room
$\alpha$ = Scaling Factor

*FIG. 5B* ial map data.

RULE BASED COMPLETION OF MAPS WITH PARTIAL DATA

FIELD OF THE INVENTION

An embodiment of the present invention is generally related to generating a map of a layout of a building or other geographic location from partial map data.

BACKGROUND OF THE INVENTION

There are a variety of situations in which there is a desire to create a map defining a complete layout of locations within a geographic location. One such application is determining an indoor layout within a building. As one example, it may be desirable to create a complete layout of stores within a shopping mall. As another example, it may be desirable to create a layout of rooms within a hospital. As another example, it may be desirable to create a complete layout of a college campus. As yet another example, it may be desirable to create a layout of aisles within an individual store.

However, creating maps of indoor places is a difficult problem. Traditionally this problem has been solved in a very brute force way, with lots of manual effort in creating a map of each new place. Using crowd sourced data is a possible solution to this problem. In a crowd sourcing approach, data is obtained from many different users and then combined to generate a map. For example, individual users of mobile devices may provide data from their mobile devices as they move around a geographic location, which is then aggregated. However, crowd sourcing suffers from potential coverage problems. The crowd sourced data will tend to reflect the popularity of different areas in terms of foot traffic. As a consequence, less popular places may require an excessively long period of time before crowd sourced data becomes available.

SUMMARY OF THE INVENTION

An apparatus and method is disclosed to generate a more complete map of a layout of a building based on partial map data. The more complete map is determined in a region of interest based on determining a most likely map in a region of interest that is consistent with, and preserves, the partial map data. A rule set is used to generate the map, where the rule set may include at least one probabilistic rule. Examples of a rule set include rules for geometrical constraints describing spatial relationships and semantic rules not based strictly on spatial relationships. In one embodiment, a cost function is used to determine the most likely layout based on partially complete map information and the rule set. The partial map information may be generated based on crowd sourced trajectory data obtained from mobile devices. Map information may also be provided to mobile devices.

BRIEF DESCRIPTION OF THE DRAWINGS

FIG. 3B illustrates an example of rules describing geometrical constraints in a mall in accordance with an embodiment.

FIG. 3C illustrates an example of additional rules for a mall in accordance with an embodiment.

FIG. 4B illustrates an example of a rule set for a mall in accordance with an embodiment.

FIG. 5B illustrates an example of a room rule set in accordance with the example of FIG. 5A.

DETAILED DESCRIPTION

Figure 1:
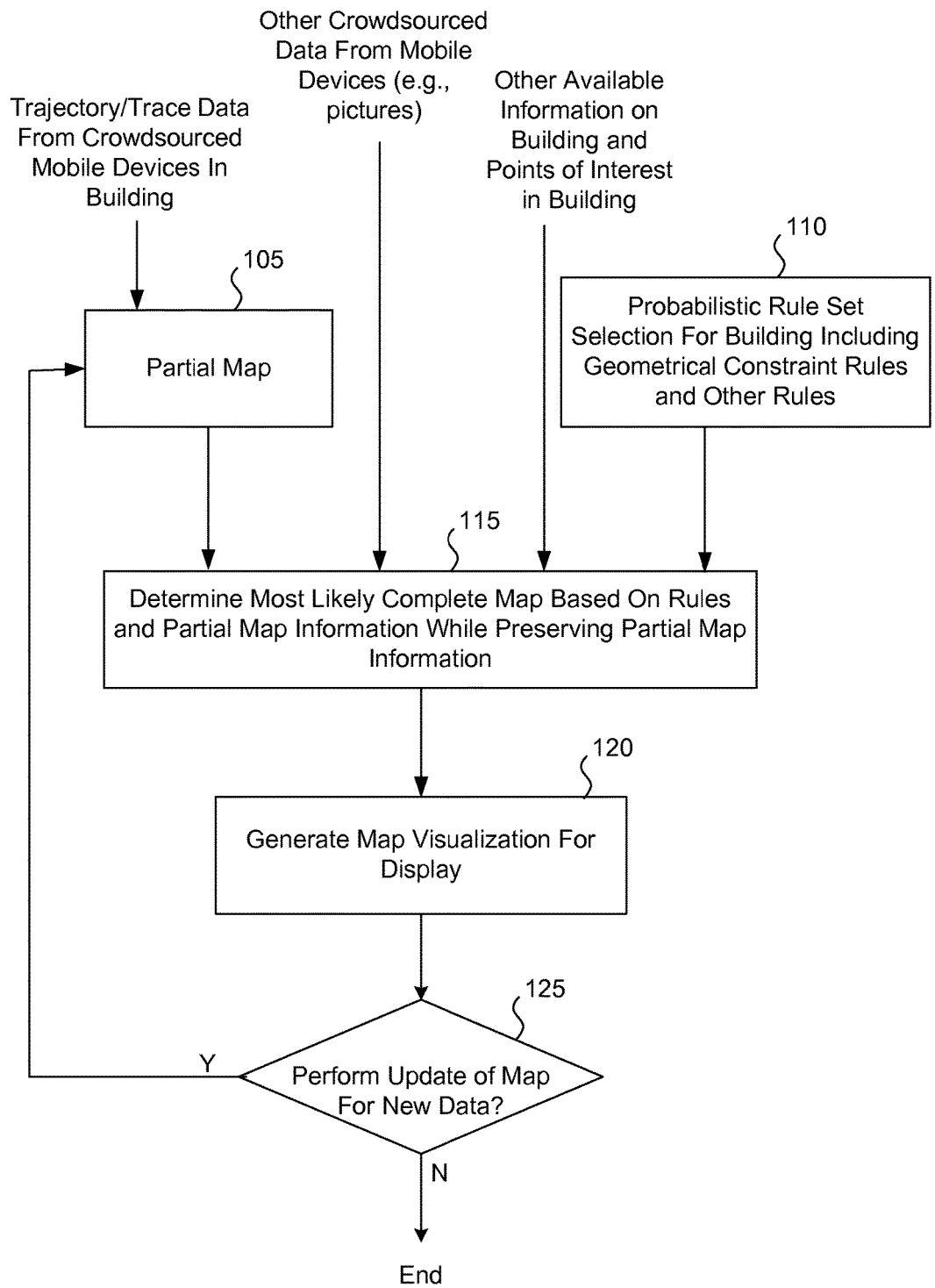
FIG. 1 illustrates a method to use a rule set to complete a partial map in accordance with an embodiment.

FIG. 1 is a flow chart illustrating an embodiment of a computer implemented method of using a set of rules to complete a partially completed map of a building in a region of interest. In one embodiment, a partial map 105 is obtained of a layout of an arrangement of areas, such as a layout of the interior of a building. However, more generally, the partial map may include at least some exterior spaces.

In one embodiment, the partial map 105 is generated or otherwise provided based on trajectory (e.g., trace) data crowd sourced from one or more mobile devices and corresponds to regions traversed by mobile device users. As examples, the trajectory data may be based on sensor data from sensors disposed on individual mobile devices. For example, individual mobile devices may include sensors, such as accelerometers, to determine position based on user movement. Additionally, individual mobile devices may include position sensors to determine position based on global positioning signals (if available) and any other available local wireless network signals such as Bluetooth or wireless LAN.

As an example, the partial map 105 may be based on instances of trajectory data. From the trajectory data, the layout of frequently trafficked areas may be identified from a pattern analysis, such as locations of main hallways. Additionally, there may be sufficient instances of trajectory data to identify other layout features based on pattern matching, such as room entrances. For example, trajectory data of one or more instances showing a mobile device moving off from a hallway may indicate a room or store entrance. However, there may be insufficient trajectory data in one or more portions of a building from which to generate a partial layout. Thus, the partial map is incomplete in at least one portion of a region of interest.

A rule set is selected 110 to aid in completing the partial map. The set of rules of the rule set permits hypothesis testing of different options for extending or completing the layout of the map in a region of interest. In one embodiment, a selection is made of a current best hypothesis consistent with the rule set and the known partial map 105. In one embodiment, the rule set may include some deterministic rules and also includes at least one probabilistic rule. In one embodiment, the rules of the rule set are used as terms in a cost function analysis.

The completion of the map may be for a desired geographic location, such as an entire interior of a building. However, more generally the map may be completed in a desired region of interest. Moreover, in some circumstances extending the partially complete map into at least on unknown region may be sufficient. For example, in a mall the desired region of interest may be the public areas of the mall and thus not include private offices in the mall. As another example, in some cases the desired region may be a subset of an entire geographic location, such as a wing of a mall. Additionally, in some embodiments the map may be completed only in regions for which there is a minimum confidence that the map that is generated is accurate to within some desired statistical confidence or accuracy. For example, if there is partial map data for only one wing of a mall, the map may be completed only in the portion of the mall for which there is sufficient partial data to generate a complete map with a desire minimum level of confidence.

In one embodiment, the rules include a set of probabilistic geometrical constraints reflecting likely relationships between different areas of a layout, where an individual area is a unit of space. As examples, a unit of space may be a room type, office unit, store unit, hallway, corridor, etc. Individual areas may be further classified into area types, such as based on size (e.g., larger area, medium area, small area) or function (e.g., food store, non-food store, etc.).

The probabilistic aspects of the geometrical constraints describe probable spatial arrangements in a layout. In the design of a building intended for a specific purpose, there are often likely spatial relationships based on economic considerations, aesthetics, design and construction efficiency, and human behavior. There may also be correlations with geographic location and year of constructions. For example, mall design has evolved slowly over many decades. There are common designs for malls of certain size ranges, dates of construction, and geographic location. In a probabilistic sense, many mall designs have a set of design attributes from which probabilistic rules can be constructed. For example, if there is partial map information indicating the presence of a first room entrance of room of a first size, then a probability that a neighboring room will have a certain size may be used in analyzing a hypothesis that in a layout the neighboring room is of a particular size.

As examples, geometric constraints may include size constraints of individual units of space, reflecting probable sizes and size variances, probabilities of interior or exterior hallways and hallway sizes, and probabilities that certain types of units of space (e.g., certain types or rooms or store) neighbor each other.

Additionally, other rules may be included that are based on other semantic information which is not strictly based on spatial considerations alone. In some cases, crowd sourced information may include names of individual regions within a geographic location. For example, names of individual stores or a total number of stores may be available. As examples, the name of a store may be obtained from a store Wi-Fi access point, from a crowd sourced picture taken on a mobile device, from someone checking into a social media site and posting information describing a location, or by requesting users of mobile devices to provide feedback. Additionally, point of interest (POI) information may be available from public sources (e.g., websites), or information beacons (e.g., wireless points of individual stores in a mall). As examples, information may be available on overall building footprint, points of interest in the building (e.g., a name of a store in a mall), and total number of stores. This semantic information may also include the type of building and year built.

The most likely complete map is determined 115 in a regions of interest based on the rule set and the partial map, where the most likely complete map has a layout of space consistent with the partial map information. That is, a complete map is generated which is an extension of the partial map 105. Thus, the complete map is consistent with and preserves the known information of the partial map 105. Thus, for example, if the partially complete map has information indicating a known hallway and a known set of room entrances, the complete map will preserve the known hallway information and the known set of room entrances. The complete map this provides additional information that is likely to be true, but which does not contradict the known partial map information. Additionally, in one embodiment the partial map information is stored to permit incremental updates of the partial map information to be created. Moreover, the raw trace data from which the partial map is generated may also be stored to permit incremental updates of both the features of the partial map and the trace data from which the partial map is generated.

In one embodiment, the complete map is used to generate a visualization 120. The visualization may include a representation that provides layout information within a region of interest or a sub-region thereof. In one embodiment, additional information may be provided to indicate to a user a confidence factor in different regions of the map to show which portions of the map have a higher likelihood of being accurate than others. The map information and confidence information may be provided to mobile devices as a service. In one embodiment, updates are performed 125 when additional data becomes available that increase the coverage of the partial map 105.

Figure 2:
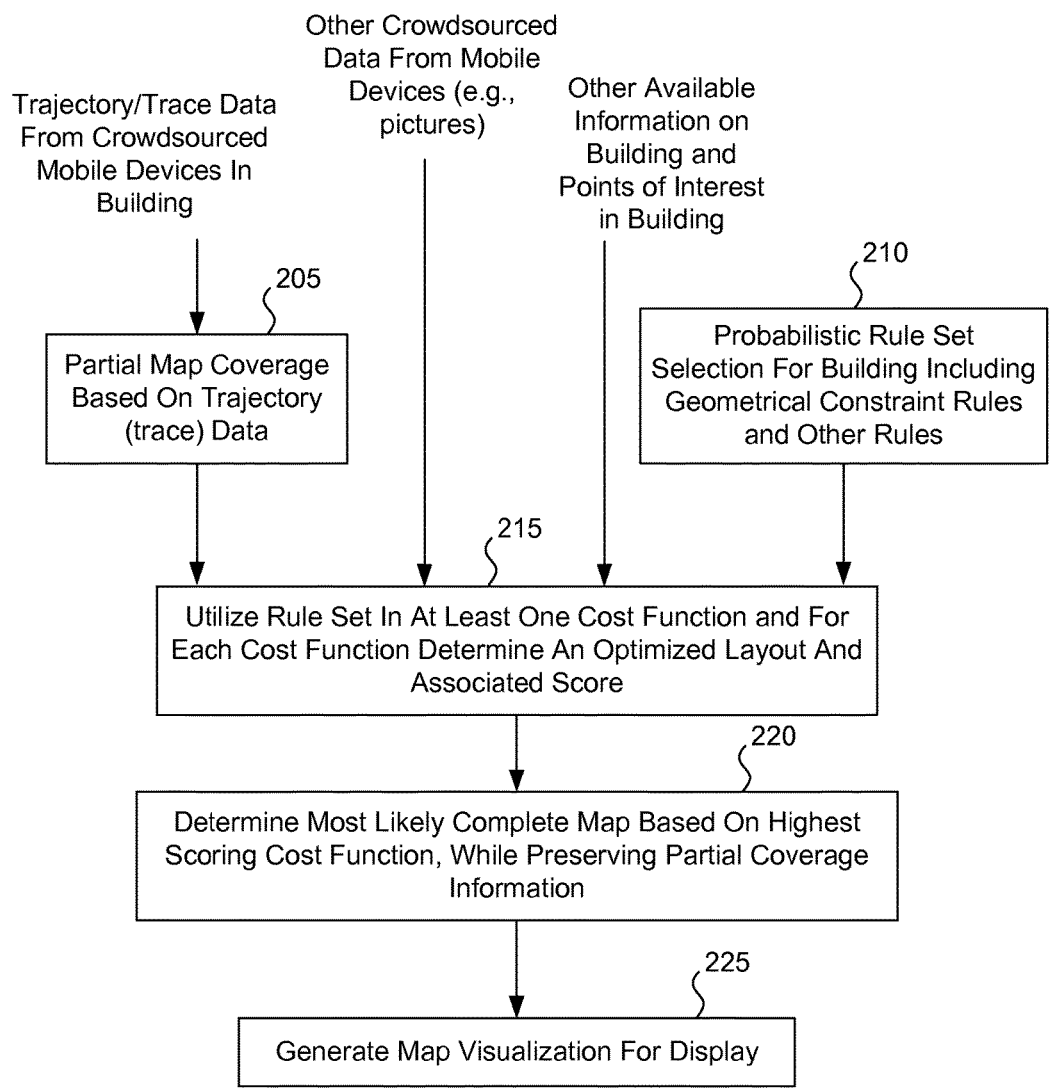
FIG. 2 illustrates a method to utilize a rule and set to complete a partial map using cost functions in accordance with an embodiment.

FIG. 2 illustrates an embodiment of a computer implemented method to generate a complete map in a region of interest based on trajectory (trace) data. Partial map coverage information 205 is obtained. For example, the partial map coverage data may be determined from trajectory data crowd sourced from mobile devices. The trajectory data may be limited to path information. However, more generally other types of information may be crowd sourced from mobile devices indicative of human behavior such as a length of time a user spent at a particular location, speed of movement of a user, acceleration, etc. For example, in the case of a mall, users often sit in certain areas of the mall, such as food courts. This additional information may in some cases be available as an auxiliary source of information. A rule set 210 is selected, where the rule set includes geometrical constraints and may also include other rules. The rule set includes probabilistic rules and may be selected based on various factors, including information on the use of the building, geographic location, the year of construction, or other factors.

In one embodiment, each rule is selected to be used as a term in a cost function. In one embodiment, a plurality of different cost functions are tested 215 in parallel. In a cost function analysis, at least one probabilistic optimization method is applied to determine a layout having an optimized layout that is consistent with the partial coverage data. In one embodiment, a set of N different methods (e.g., belief propagation, Mote Carlo methods, or other multi-variable optimization approaches) are applied, and the results of the highest scoring method is selected as an optimized layout.

The results of a highest scoring cost function selected 220 to determine the most likely complete map. The rules may then be used to identify an optimal interior layout (e.g., of rooms, hallways, open spaces) such that the total cost is minimized, and known areas of the partial map are preserved.

A map visualization is generated 225 for display of layout information for a region of interest. In one embodiment, the visualization also shows regions of the map having a lower statistical confidence.

The partial map data may be stored to permit incremental updates of the partial map as more data become available. Additionally, the trajectory data may be stored to permit incremental updates of the trajectory data. This aids is generated an updated map when additional data becomes available.

The rule set may be generated in a variety of different ways. A particular category of building tends to have certain implicit rules on a likely layout of the building based on economic considerations, aesthetics, design and construction efficiency, and human behavior. Additionally, the year of construction, size, and general geographic location may be relevant in terms of building design trends. For example, modern shopping malls in the United States often have one or more larger anchor stores, some mid-size stores, and a set of smaller stores. While there are few truly identical shopping malls, there are many shopping malls that are similar in terms of geometrical constraints and the likelihoods that certain stores of certain sizes will be next to each other. There are also several common overall mall footprints regarding common overall mall sizes and shapes.

In contrast, hospitals are typically organized in a different way than malls. As an example, in many hospitals most types of rooms are clustered and relatively small compared to many other classes of buildings. For example, patient rooms are typically clustered, labs are often clustered, and operating rooms are often clustered. Hospitals also often have exterior hallways.

Figure 3A:
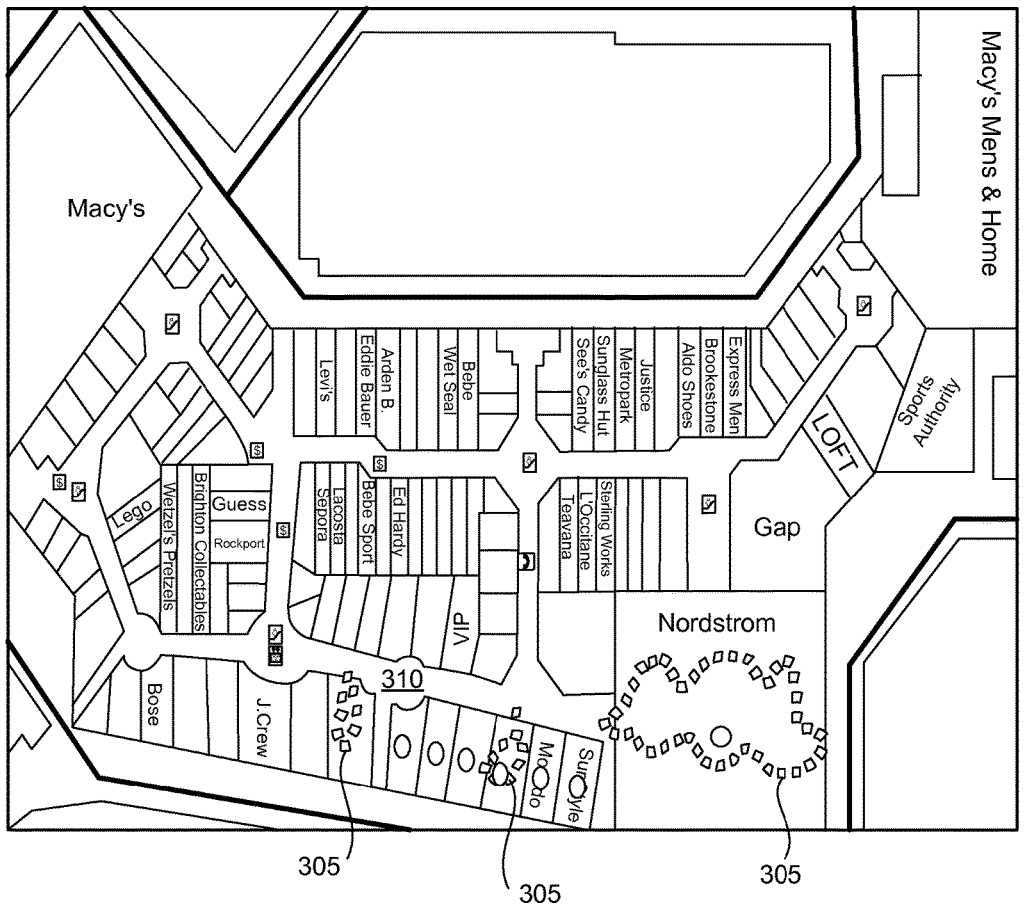
FIG. 3A illustrates an example of a map of a mall.

FIG. 3A illustrates an example of a mall layout having a variety of different stores. In this example, trajectory data is illustrated as dashed lines 305. A hallway 310 may be known due to frequent traffic. In this example, there is trajectory data for a subset of small stores and also for a larger anchor store. Thus, an entrance to a small store and an anchor store may be determined from instances of trajectory data. The challenge then is to take the incomplete partial map data and use rules to generate a more complete map in a region of interest for which there is incomplete data, such as for stores along the hallway 310.

For the case of a shopping mall, a rule set may be selected that reflects common industry practices in designing shopping malls. For example, in many malls many stores have approximately the same store front width. There are also often larger anchor sores. Food stores and restaurants are often smaller and clustered around an open area (e.g., a food court). Hallways are often in the interior, except at the entrance. Many stores have approximately the same store front width. There are various probabilities associated with a likely store layout, such as store size variance, store size consistency, neighboring and/or nearby stire likelihoods (that specific store types are proximate each other), likelihoods of size similarities of a store to other stores, and likelihoods that hallways are located in the interior or exterior of a mall.

FIG. 3B is an illustrative example of a set of geometric constraints derived from a set of known mall maps to form examples of learned values. In this example, there are three different common store sizes and associated size variances. There are also probabilities associated with nearby store size consistency, next to a store probability, next to an anchor store probability, next to a food store probability, a likelihood of size similarity to detected store of same category, and a probability of hallways neighboring the exterior of the building. More generally, other geometric constraints could be derived from known mall maps. Additionally, the geometric constraints could be customized based on factors such as overall mall size, year of construction, geographic location, or other factors.

Additionally, as illustrated in the example of FIG. 3C, the set of rules for a mall can include other semantic rules. Some of these semantic rules may be deterministic while others may be probabilistic. Crowd sourcing may be used to determine the name of one or more stores in a mall. Additionally, beacons may also be used to identify individual stores. Malls often have store clustering. If a given store type is detected (e.g., Gap®), there may be an associated probability of a specific store of similar type being nearly (e.g., a Prada® store near a Gap® store). There may be a total number of shops available from a POI database (DB). There may be some overall shape probabilities associated with the mall footprint size, number of anchor stores, etc. Shop size may also be based on the mall footprint and hallway geometry.

Figure 3D:
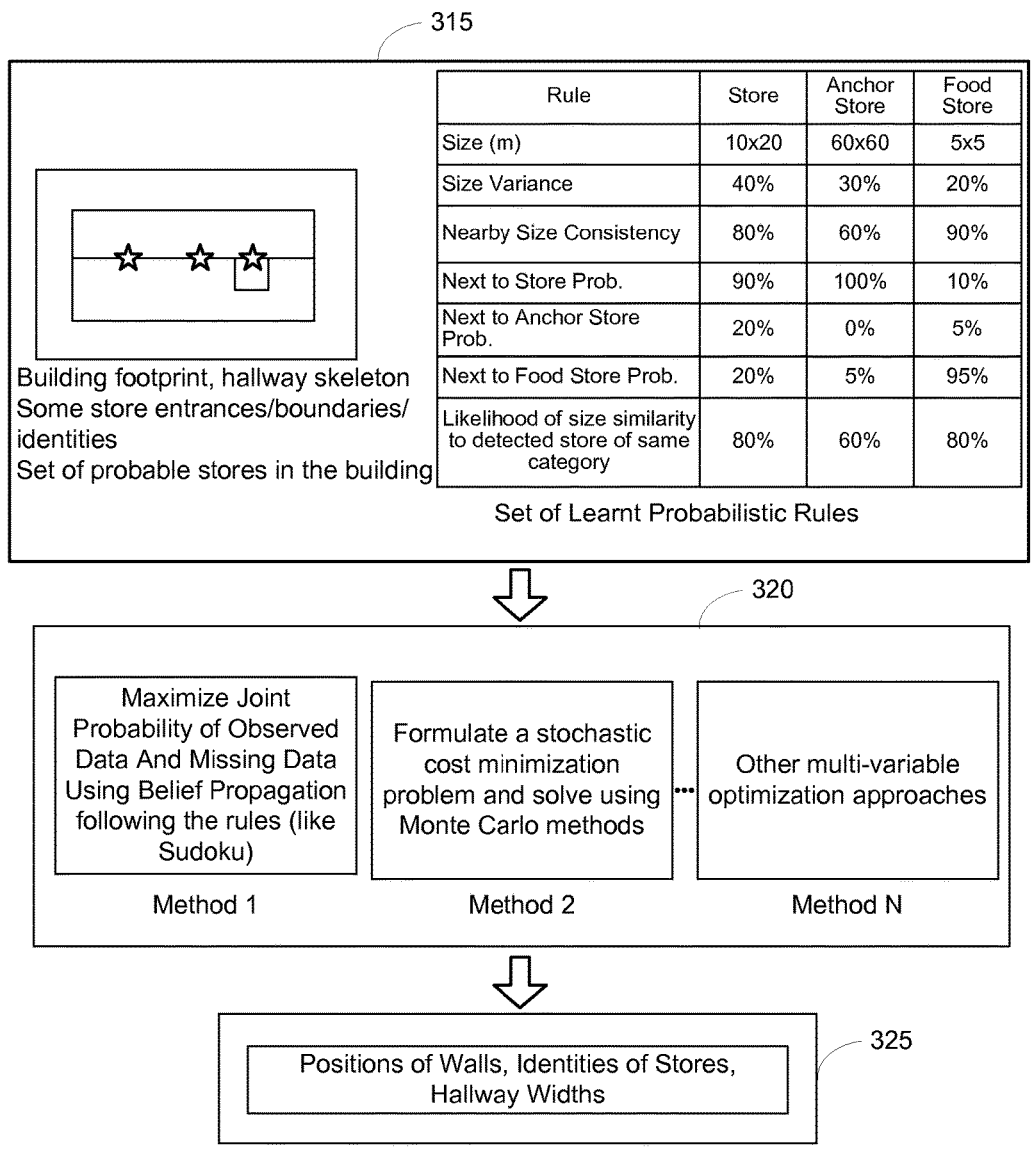
FIG. 3D illustrates an example of a method to determine a most likely layout of a mall in accordance with an embodiment.

FIG. 3D illustrates an example of the rule set of FIGS. 3B and 3C applied to a mall. In this example, the mall is partially mapped in that a hallway skeleton is mapped along with some store entrances or boundaries. The identity of one or more stores may be known. The building footprint may also be known. There is thus a set of initial information 315 that includes partial map information and a rule set. A set of cost function methods is then applied 320 in parallel to the initial information 315. The result of the highest scoring method is then selected 325 to create a map in a region of interest showing the most likely position of walls, identities of stores, and hallway widths.

Figure 4A:
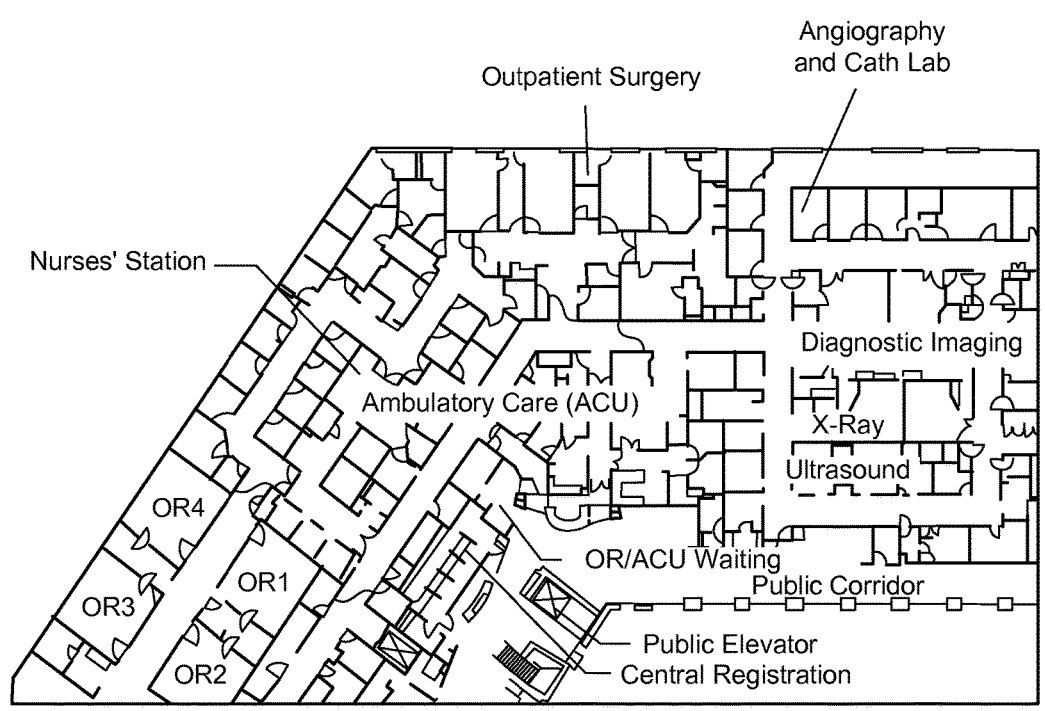
FIG. 4A illustrates an example of a map of a hospital.

FIG. 4A illustrates an example of a hospital layout. In this example, the hospital includes a cluster of four operating rooms (ORs), nurses' stations, patient rooms, and labs. FIG. 4B illustrates an example of rule set of learned values based on analyzing several hospital designs. The rule set includes rules for the size of each type of room, a size variance, a nearby size consistency, a next to patient room probability, a next to lab probability, a next to operating room probability, a likelihood of a size similarity to a detected room of the same category; and a chance of hallways on the exterior.

Figure 5A:
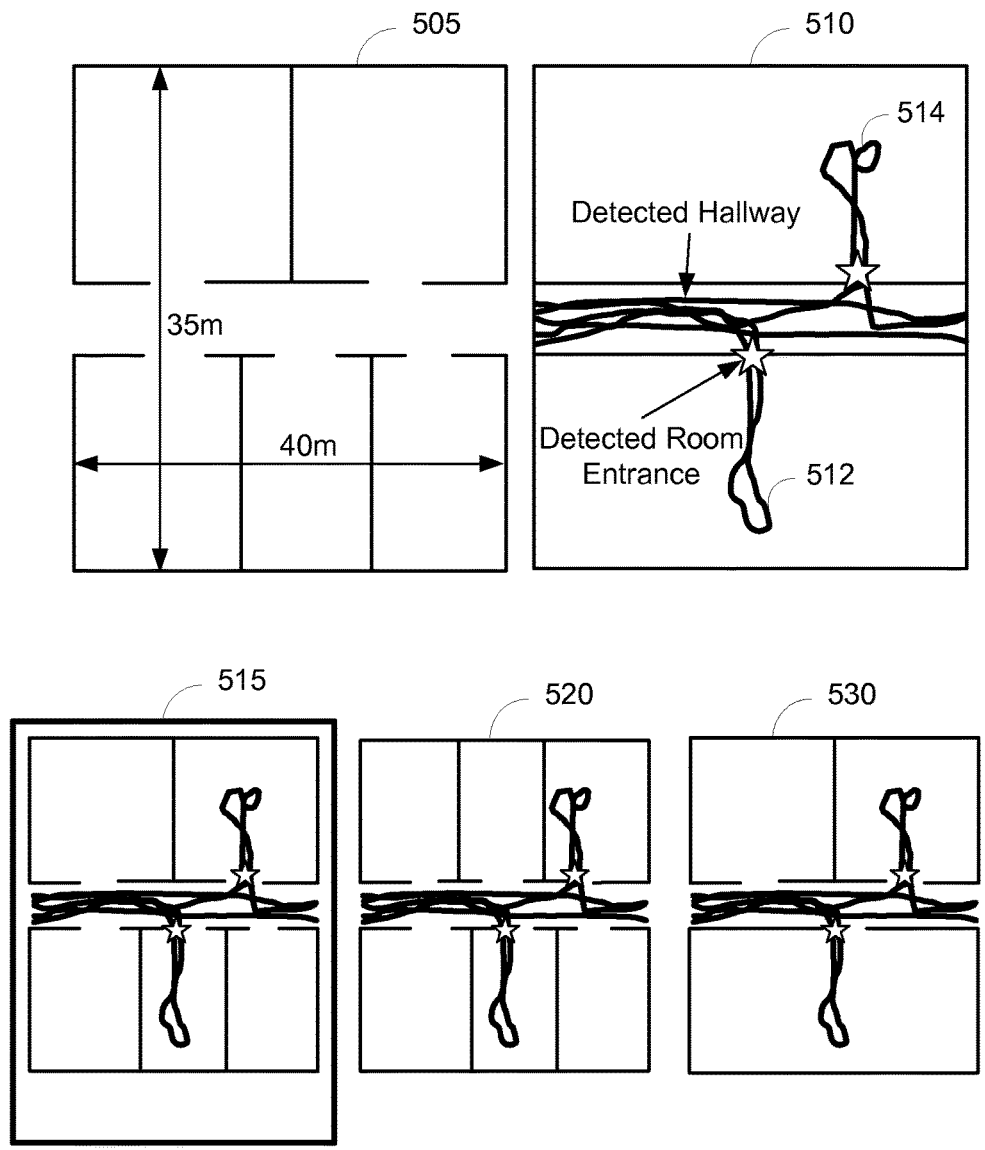
FIG. 5A illustrates an example of hypothesis testing to determine a room layout based on a scoring technique in accordance with an embodiment.
Figure 6:
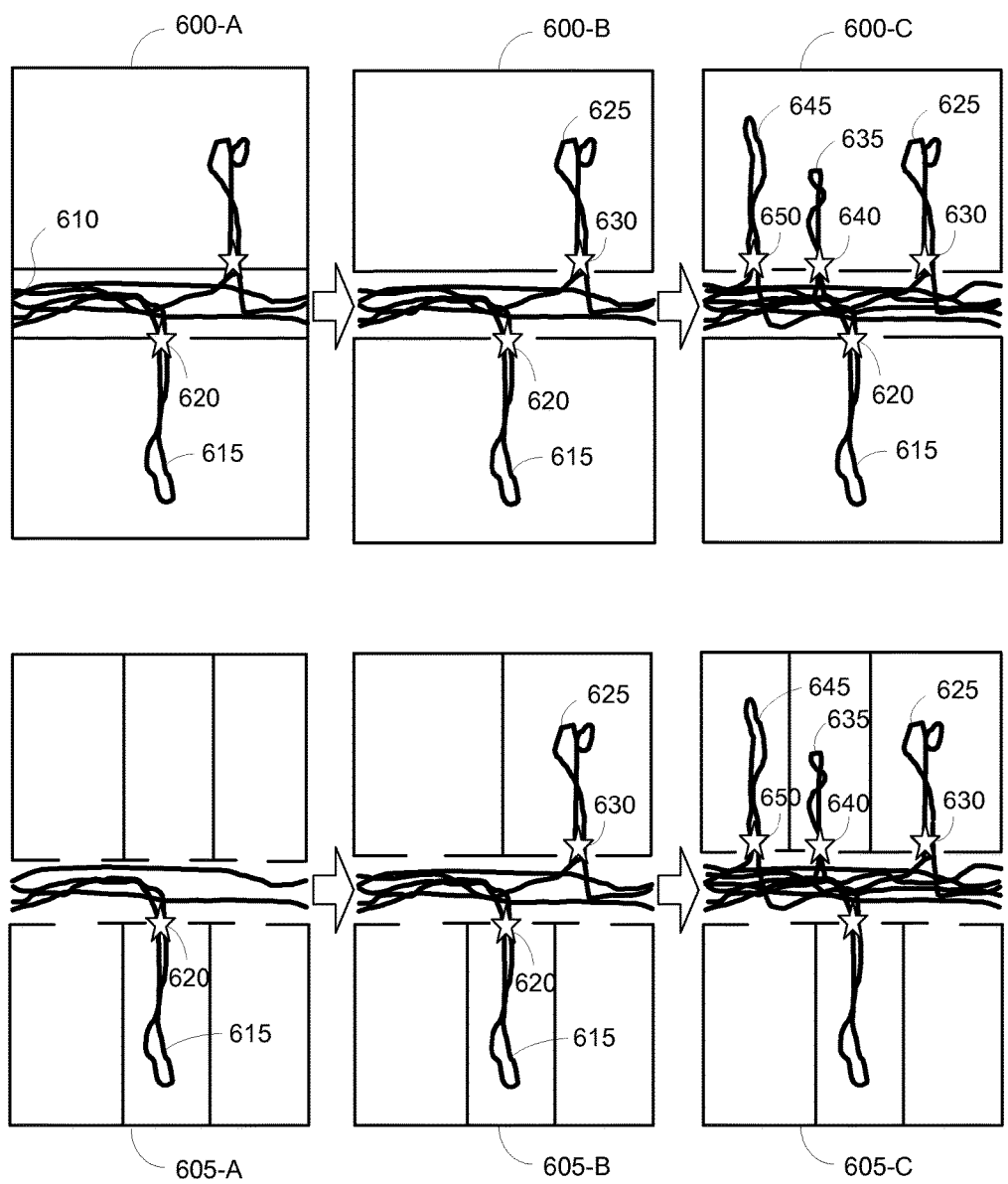
FIG. 6 illustrates how incremental updates in a partial map generate changes to the complete map in accordance with an embodiment.
Figure 7:
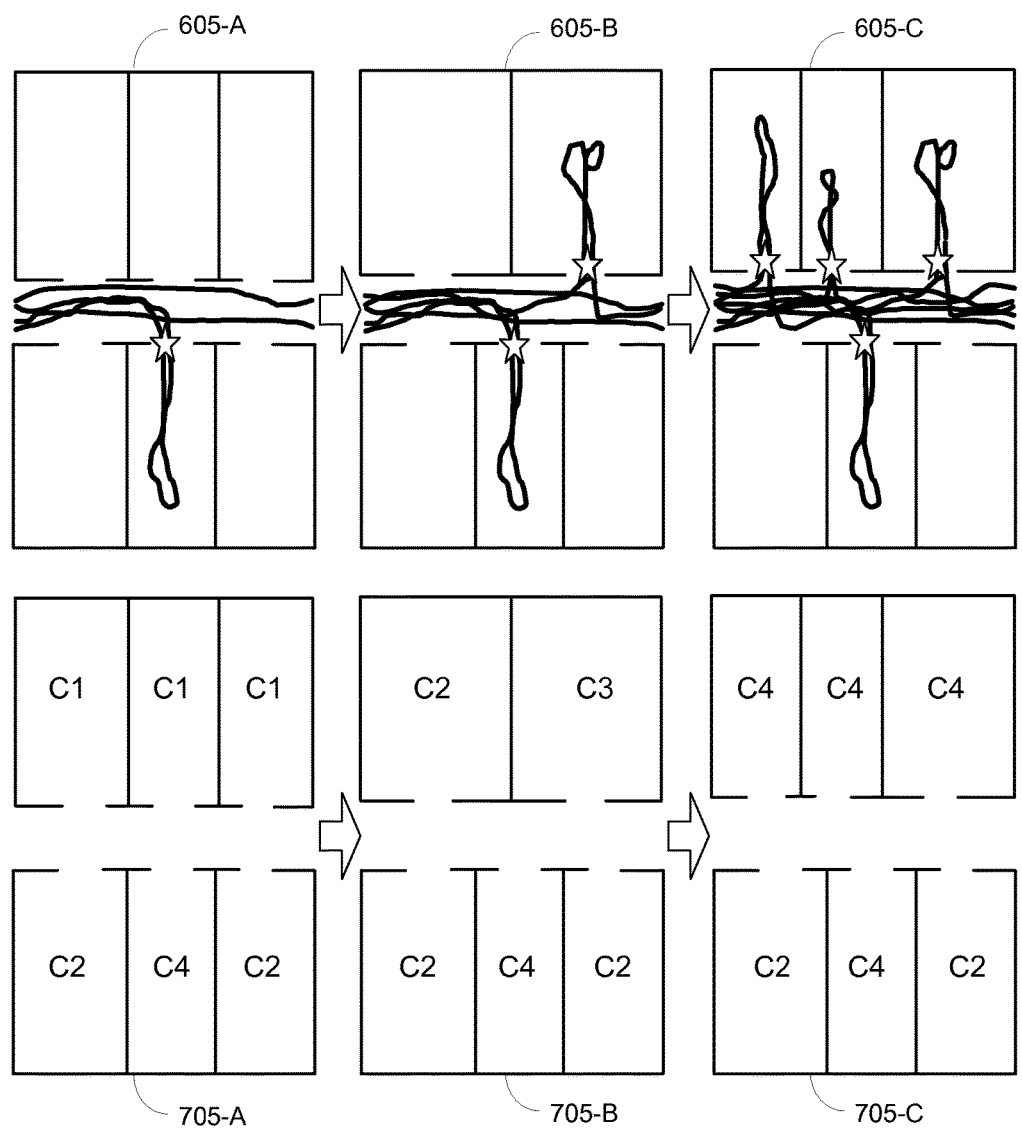
FIG. 7 illustrates how a confidence in different regions of the maps of FIG. 6 changes with incremental updates in accordance with an embodiment.

FIGS. 5, 6, and 7 illustrate a relatively simple room layout with a simple example rule set applied to illustrate some aspects of hypothesis testing, incremental updates, and confidence levels. FIG. 5A illustrates an example of a simple building with five rooms in plot 505. Plot 510 illustrates trajectory data 512, and 514 as well as a detected hallway and a detected room entrance. Hypothesis testing is then performed for three different possible layouts in plots 515, 520, and 530. In the examples of plots 515, 520, and 530 the rule set is comparatively simple and includes a room width rule, a rule similarity rule, and a room entrance rule are employed. As illustrated in FIG. 5B, a room width rule may generate a score based on a current width, an ideal width, and a scaling factor. A room similarity rule generates a score based on a current room size, a size of rooms to the left, a size of rooms to the right, and a scaling factor. A room entrance location rule generates a score based on a length of a wall from an entrance to a left side of a room, a length of a wall from an entrance to a right side of a room, and a scaling factor. Thus, different room layouts consistent with initial partial map information may be scored. In this example, plot 515 has the highest score, while plots 520 and 530 have lower scores.

One aspect of hypothesis testing is that the accuracy of the complete map increases if additional partial map information becomes available. FIG. 6 shows an example of how map accuracy increases when additional trajectory information becomes available. Plot 600-A shows a known hallway 610 and trajectory data 615 to determine the location of one room entrance 620. At some later point in time, plot 600-B illustrates that additional trajectory data 625 may become available to determine a second room entrance 630. As illustrated in plot 600-C, at some still later point in additional point in term, there may yet be still additional trajectory data available such that trajectory data 635 is available to determine a third room entrance 640 and trajectory data 645 is available to determine a fourth room entrance 650.

Plot 605-A illustrates a map generated from the information in plot 600-A. Plot 605-B illustrates a map generated based on the information in plot 600-B. Plot 600-C illustrates a map based on the partial trajectory data of plot 600-C. As can be seen in plots 605-A, 605-B, and 605-C, the maps increase in accuracy when more trajectory data becomes available. However, note that the complete map is always consistent with the known layout information regarding known room entrances. Thus, the complete map is a most likely map in a region of interest that is consistent with and extends the information of partial map information.

FIG. 7 illustrates how the incremental updates increase a confidence in the output map. As more trajectory data become available, the confidence that the layout of individual rooms in the map is correct increases. This may be visually displayed such as by a color code, a change in texture, or a textual display, or by other techniques. For the purposes of illustration, suppose that there is a first (low) confidence C1, a second (medium) confidence C2, a third medium (high confidence) C3, a higher confidence C4. This additional confidence information may be provided to indicate to a user the confidence that various portions of the layout of complete map are correct. Moreover, the confidence information could also be used in other ways. For example, a complete map could be provided only in regions satisfying a minimum confidence level. As another option, users might be able to select a desired minimum confidence level to display map information. As still yet another example, in a crowd sourcing application, users could be invited to provide information on regions having a low confidence.

Figure 8:
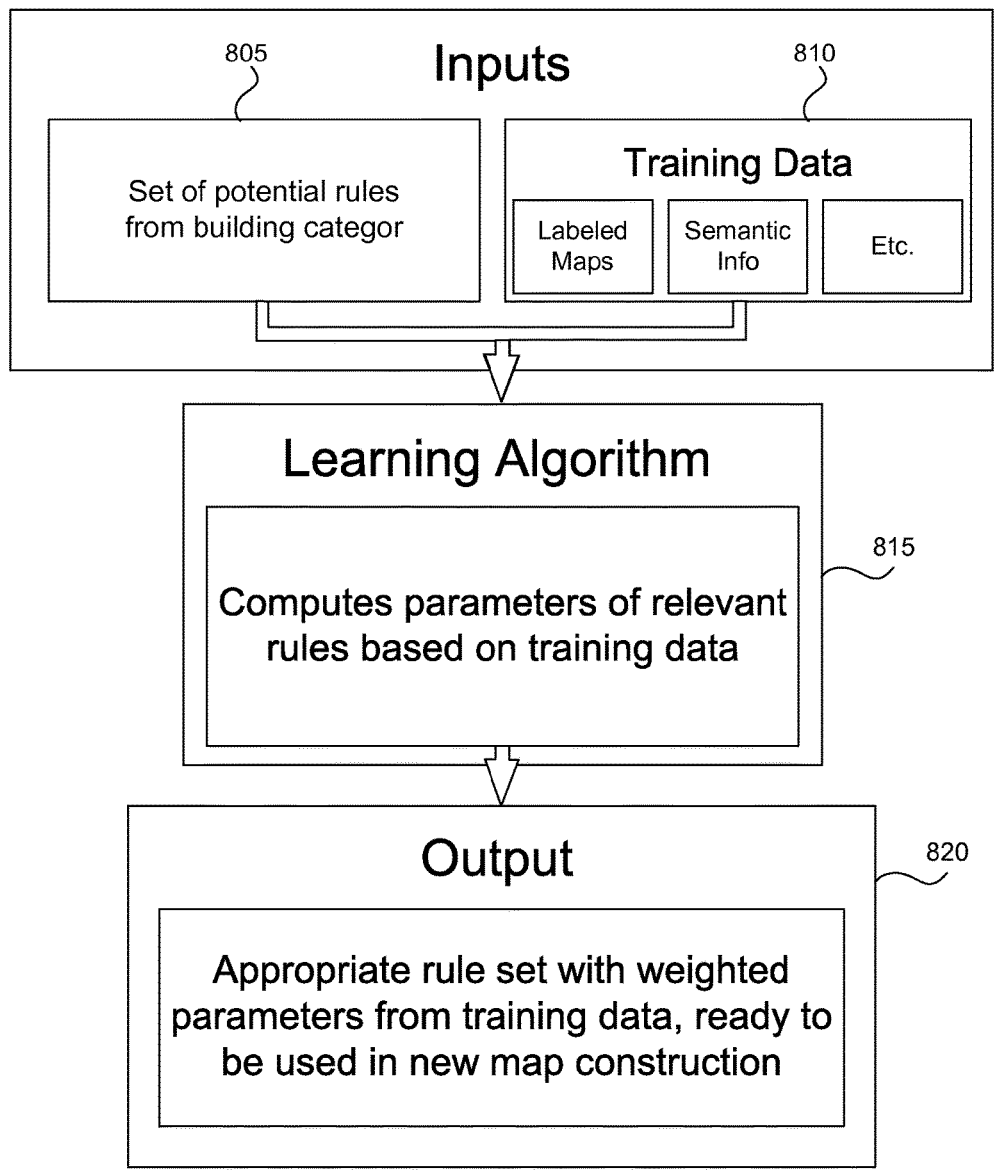
FIG. 8 illustrates method of generating a rule set in accordance with an embodiment.

FIG. 8 illustrates an example of an algorithm to generate learned rules for a rule set. A set of potential rules is identified 805 for a building category. Training data 810 is provided. Examples of training data include labeled maps for buildings of a particular category. For example, for malls, the training data may include labeled maps of known malls. The training data may also include other semantic information. For example, in the case of malls, the semantic information may include other non-layout information different than the labeled maps. A learning algorithm computes parameters 815 of relevant rules based on the training data. The output 820 is a rule set with weighted parameters generated from the training data. The rules are created to be flexible enough to be used along with trace data to fill in unknown parts of building layouts without modifying existing known rooms or halls.

Figure 9:
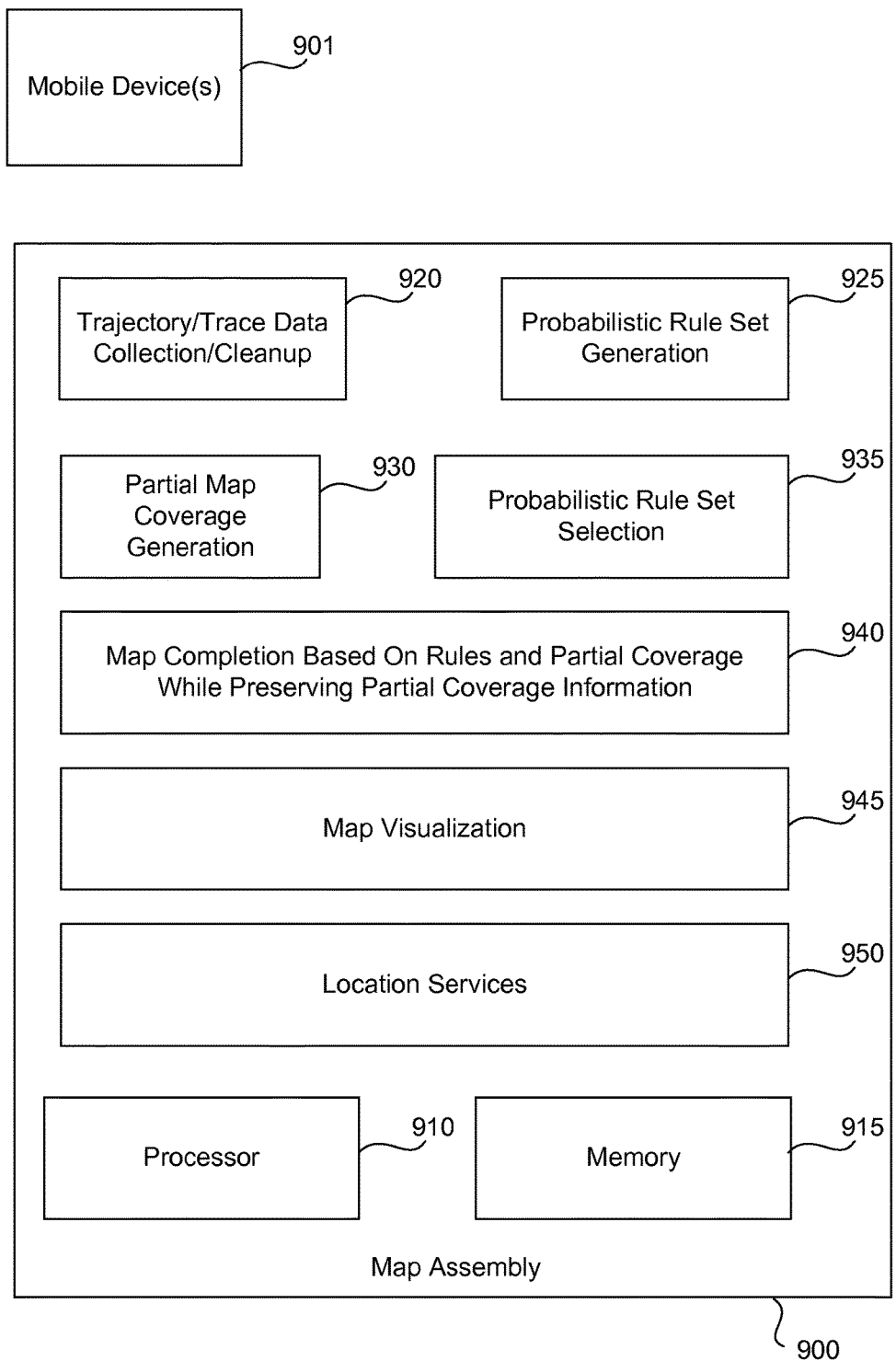
FIG. 9 illustrates an apparatus in accordance with an embodiment.

FIG. 9 is a block diagram of an apparatus in accordance with an embodiment. A map assembly unit 900 includes a processor 910 and a memory 915. In one embodiment, the map assembly unit 900 is implemented as one or more servers. The map assembly unit 900 may, in some embodiments, receive trace data directly from mobile devices 901. However, more generally the trace data could be obtained from another entity. The map assembly unit 900 may also provide map information or location information to an individual mobile device for display on a display of a mobile device having its own processor, memory, and display. In one embodiment, the map assembly unit 920 may be used to implement any of the previously described methods or subsets thereof.

One or more individual components of the map assembly unit 900 may be implemented as software stored on the memory 915 and executing on the processor 910. A trajectory/trace data collection unit 920 obtains trajectory data crowd sourced from mobile devices and performs any necessary data cleanup. In one embodiment, a rule set generation unit 925 is provided to generate probabilistic rules based on training data. A partial map coverage generation unit 930 determines a partial map from the trajectory data, where the partial map may as identifying hallways and one or more building layout areas, such as a room or store entrance. A rule set selection unit 935 is used to select a rule set for a particular use. In the most general case, there may be a large number of different rule sets, such as rule sets tailored to particular classes of building and further tailored based on factors such as likely year of construction, geographic location, or other factors. A map completion unit 940 generates a complete map in a region of interest based on the rules of the rule set and which preserves the partial map information. A map visualization unit 945 generates map visualization information, which may, for example, be provided to mobile devices to generate a map display. Additionally, the map information may be used to aid in providing other types of location services, such as services based on the location of a user of a mobile device.

Additional applications and extensions are contemplated beside mapping of rooms or other units of space in a building. Another application is to generate a map of an interior of a store. Stores often locate goods according to certain general marketing rules. For example, in a food store dairy products are often located at the back of the store, produce tends to be located at an edge, and frozen foods are located in the middle of the store. Thus for a crowd sourcing could be used to generate partial information on food placement and probabilistic rules used to determine a most likely complete map of the interior of the store. Additionally, crowd sourcing may also include data from the sensors of a mobile devices suggesting item placement. For example, temperature sensors in a mobile device may suggest the location of portions of a food store having refrigerated items. Accelerometer information and motion sensors in a mobile device may suggest hand and arm movements, such as reaching for shelves. Crowd sourced information may also include social media postings, such as users posting that they are going to a store to purchase a particular type of food.

While applications have been described for mapping an interior of a building, additional extension are contemplated to include exterior spaces. For example, many building include at least some exterior spaces. Moreover, in some instances exterior spaces are organized into units of space analogous to rooms or stores.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A computer implemented method of generating a completed map indicating a layout of an arrangement of areas within a building, the method comprising:
   obtaining a partially-complete map of a layout of a region of interest within the building, the partially-complete map being incomplete in at least one portion of the region of interest due to insufficient trajectory data; and
   generating the complete map including the at least one portion of the region of interest, wherein the complete map is based on utilizing a rule set and the partially-complete map and the complete map preserves layout information of the partially-complete map, wherein the rule set includes rules identified based upon a building category of the building and describing geometrical constraints of the building category.

2. The method of claim 1, wherein the partially-complete map is determined based on crowd-sourced trajectory data from at least one mobile device.

3. The method of claim 1, wherein the rule set includes at least one probabilistic rule describing geometrical constraints on the arrangement of areas within the building.

4. The method of claim 3, wherein the generating the complete map comprises performing hypothesis testing of different layouts consistent with the rule set and the partially-complete map.

5. The method of claim 3, wherein a cost function analysis is performed to determine the complete map in the region of interest within the building.

6. The method of claim 3, wherein the rule set includes, for the building category, at least one geometrical constraint rule describing geometrical constraints of a size of plurality of different area types and probabilistic relationships between the plurality of different area types.

7. The method of claim 1, further comprising:
   obtaining an updated partially-complete map; and
   generating an updated map, wherein the updated map is based on utilizing the rule set and the updated partially-complete map, wherein the updated map preserves layout information of the updated partially-complete map.

8. The method of claim 1, further comprising:
   generating a display illustrating the complete map with a visual indication of a confidence factor of individual areas of the layout.

9. A computer implemented method of generating a map indicating a layout of an arrangement of areas within a building, the method comprising:
   identifying a partial layout of the building based on a plurality of trajectories representing movement of at least one mobile device within the building;
   selecting a rule set that includes rules identified based upon a building category of the building and describing geometrical constraints on the arrangement of areas within the building, the rule set including at least one probabilistic rule describing spatial relationships of a plurality of different areas of the building; and
   determining a complete layout in a region of interest within the building based on utilizing the rule set to determine the complete layout consistent with the partial layout.

10. The method of claim 9, wherein the rule set further comprises non-probabilistic rules describing geometrical constraints of the building.

11. The method of claim 10, further comprising:
    determining a building type from a plurality of building types; and
    wherein the selecting a rule set includes selecting a rule set specific to the building type.

12. The method of claim 11, wherein the rule set includes, for a particular building type, at least one geometrical constraint rule describing geometrical constraints of a size of plurality of different area types and probabilistic relationships between the plurality of different area types.

13. The method of claim 9, the method further comprising:
    identifying an updated partial layout of the building based on an updated plurality of trajectories; and
    determining an updated complete layout based on utilizing the relationships of the rule set and the updated plurality of trajectories and that the updated complete layout is consistent with the updated partial layout.

14. The method of claim 9, further comprising generating a display illustrating the complete layout in the region of interest within the building with a visual indication of a confidence factor of individual areas of the complete layout.

15. The method of claim 9, wherein the rule set further comprises a point of interest rule based on point of interest information identifying an attribute of at least one area of the building.

16. The method of claim 15, wherein the point of interest rule defines a probability of a size of the at least one area of the building.

17. The method of claim 15, wherein the point of interest rule defines a probability of an attribute of an area adjacent to the point of interest.

18. A computer implemented method of providing location services for an interior of a building, comprising:
    obtaining a partially-complete map of the interior of a building via crowd-sourced information representing a movement of at least one mobile device user in the interior of the building, the partially-complete map being incomplete in a region of interest due to insufficient trajectory data;
    selecting a rule set based upon a building category of the building and describing at least one geometrical probabilistic constraint on arrangement of areas within the building; and
    generating a complete map including at least the region of interest of the building based on utilizing the rule set and the partially-complete map, wherein the complete map preserves layout information of the partially-complete map.

19. The method of claim 18, further comprising providing visualization data to display the complete map.

20. A computer implemented method, comprising:
providing map information of a layout in a region of interest of a building, wherein the map information is generated from partially-complete map layout information by utilizing at least one probabilistic rule to determine the layout of the region of interest that preserves the partially-complete map layout information, wherein the partially-complete map layout information being incomplete due to insufficient trajectory data, and wherein the at least one probabilistic rule is based upon a building category of the building and describes geometrical constraints of the building category.

21. A system, comprising:
a map assembly server computer including at least one processor and a memory, the map assembly server computer configured
to generate a complete map including at least a region of interest of a building based on utilizing a probabilistic rule set and a partially-complete map, wherein the partially-complete map being incomplete in the region of interest of the building due to insufficient trajectory data, wherein the rule set includes rules based upon a building category of the building and describing geometrical constraints of the building category, and wherein the complete map preserves information of the partially-complete map.

* * * * *